(12) United States Patent
Luo et al.

(10) Patent No.: US 12,723,749 B1
(45) Date of Patent: Sep. 1, 2026

(54) LED LIGHTING STRUCTURE AND GROW LIGHT

(71) Applicant: SINOWELL (SHANGHAI) CO., LTD., Shanghai (CN)

(72) Inventors: Jia Luo, Shanghai (CN); Yun Fei Duan, Shanghai (CN); Liang Zhou, Shanghai (CN); Zhengteng Gu, Shanghai (CN)

(73) Assignee: SINOWELL (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 19/409,020

(22) Filed: Dec. 4, 2025

(30) Foreign Application Priority Data

Apr. 24, 2025 (CN) ........................ 202520799398.3

(51) Int. Cl.

| | |
|---|---|
| ***F21V 31/04*** | (2006.01) |
| ***A01G 7/04*** | (2006.01) |
| ***F21S 4/28*** | (2016.01) |
| *F21Y 103/10* | (2016.01) |
| *F21Y 113/17* | (2016.01) |
| *F21Y 115/10* | (2016.01) |

(52) U.S. Cl.
CPC ............. *F21V 31/04* (2013.01); *A01G 7/045* (2013.01); *F21S 4/28* (2016.01); *F21Y 2103/10* (2016.08); *F21Y 2113/17* (2016.08); *F21Y 2115/10* (2016.08)

(58) Field of Classification Search
CPC .......... F21V 31/005; F21V 31/04; F21S 4/28; A01G 7/045
USPC .................................................. 362/267, 310
See application file for complete search history.

(56) References Cited

U.S. PATENT DOCUMENTS

| | | | | |
|---|---|---|---|---|
| 10,801,716 | B1 * | 10/2020 | Lopez-Martinez ..... | F21V 15/01 |
| 2018/0306413 | A1 * | 10/2018 | Tremaine ................ | F21V 31/04 |
| 2024/0167641 | A1 * | 5/2024 | Gerard .................... | F21V 5/007 |

* cited by examiner

*Primary Examiner* — Thomas M Sember
(74) *Attorney, Agent, or Firm* — ArentFox Schiff LLP

(57) ABSTRACT

Provided are an LED lighting structure and a grow light. The grow light includes a housing, a light-transmissive module, and a lighting module. The light-transmissive module is connected to the housing. The lighting module is disposed in a cavity formed between the light-transmissive module and the housing. The housing is located at a back side of the lighting module, and the light-transmissive module is located at a light-emitting side of the lighting module. At least a portion between the lighting module and the light-transmissive module is filled with a light-guiding filling unit. The LED lighting structure and the grow light according to the present disclosure can improve optical output.

18 Claims, 2 Drawing Sheets

LED LIGHTING STRUCTURE AND GROW LIGHT

CROSS-REFERENCE TO RELATED APPLICATION

This application claims priority to Chinese Patent Application No. 202520799398.3 filed Apr. 24, 2025, the disclosure of which is incorporated herein by reference in its entirety.

TECHNICAL FIELD

The present disclosure relates to the technical field of lighting technology, and in particular, to an LED lighting structure and a grow light.

BACKGROUND

In the prior art, a gap exists between the lens and the LED component, which causes light loss, dust accumulation, and contamination, and reduces the protection performance of the luminaire.

In addition, the LED components generate a large amount of heat during operation, and the conventional lens structures fail to effectively improve the heat dissipation performance.

Moreover, in the field of plant lighting, how to reduce optical loss remains an urgent issue to be solved.

SUMMARY

In one aspect, the present disclosure provides an LED lighting structure. By filling material between the light-transmissive module and the lighting module, the LED lighting structure according to the present disclosure improves optical output.

The LED lighting structure according to the present disclosure includes a housing, a light-transmissive module, a lighting module, and a light-guiding filling unit. The housing has an elongated shape. The light-transmissive module is connected to the housing, and at least one cavity is formed between the light-transmissive module and the housing. The lighting module is disposed within the cavity, with the housing located at a back side of the lighting module, and the light-transmissive module located at a light-emitting side of the lighting module. The light-guiding filling unit is arranged in the cavity along an extension direction of the housing and located between the lighting module and the light-transmissive module.

In another aspect, the present disclosure provides a grow light. By filling material between the light-transmissive module and the lighting module, the grow light according to the present disclosure improves optical output.

The grow light according to the present disclosure includes a housing, a light-transmissive module, and a lighting module. The light-transmissive module is connected to the housing. The lighting module is disposed in a cavity formed between the light-transmissive module and the housing. The housing is located at a back side of the lighting module, and the light-transmissive module is located at a light-emitting side of the lighting module. At least a portion between the lighting module and the light-transmissive module is filled with a light-guiding filling unit.

DETAILED DESCRIPTION

The solutions in the embodiments of the present disclosure will be described clearly and completely in connection with the accompanying drawings in the embodiments of the present disclosure from which the solutions will be apparent to those skilled in the art. The embodiments described below are only part, not all, of embodiments of the present disclosure. Based on the embodiments described herein, all other embodiments obtained by those of ordinary skill in the art without creative work are within the scope of the present disclosure.

It is to be noted that the terms such as "first" and "second" in the description, claims, and preceding drawings of the present disclosure are used to distinguish between similar objects and are not necessarily used to describe a particular order or sequence. It is to be understood that the data used in this manner is interchangeable when appropriate so that embodiments of the present disclosure described herein can also be implemented in a sequence other than those illustrated or described herein. Additionally, terms "comprising", "including", and any other variations thereof are intended to encompass a non-exclusive inclusion. For example, a process, method, system, product, or device that includes a series of steps or units not only includes the expressly listed steps or units but may also include other steps or units that are not expressly listed or are inherent to such a process, method, product, or device.

A light-emitting diode (LED) is a type of semiconductor device capable of directly converting electrical energy into light energy, and it is widely applied in the field of illumination and other related areas.

In conventional lighting structures, a gap often exists between the lighting module and the lens. The applicant has found that such a gap not only affects appearance but, more importantly, causes light emitted from the lighting module to be lost. Dust is also more likely to enter the gap, causing contamination, which further affects the service life of the lighting structure and degrades its protection performance. Moreover, in traditional lighting structures, the LED component and the lens are connected through a rubber sealing ring, making the manufacturing and assembly processes more complicated.

LED Lighting Structure

Figure 1:
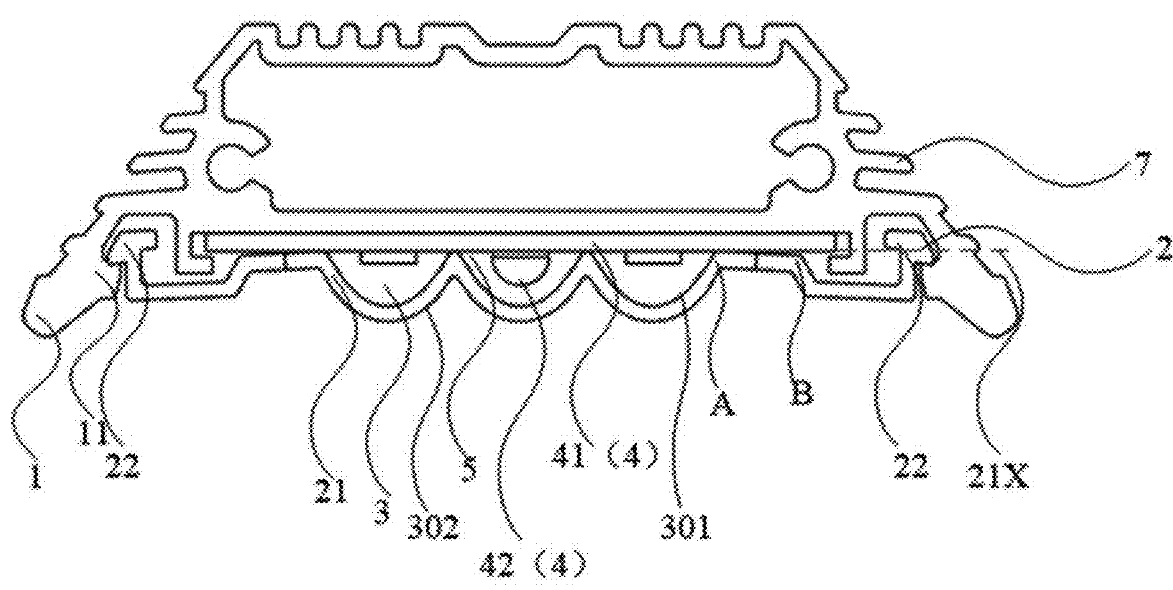
FIG. 1 is a cross-sectional view of an LED lighting structure according to an embodiment of the present disclosure.

To overcome the problems in the prior art, in one aspect, the applicant creatively provides an LED lighting structure. FIG. 1 is a cross-sectional view of an LED lighting structure according to an embodiment of the present disclosure. Referring to FIG. 1, the LED lighting structure provided in this embodiment includes a housing 1 and a light-transmissive module 2. The housing 1 has an elongated shape, and the light-transmissive module 2 is connected to the housing 1. At least one cavity 3 is formed between the light-transmissive module 2 and the housing 1. A lighting module 4 is disposed along the extension direction of the housing 1 within the cavity 3. The housing 1 is located at a back side of the lighting module 4, and the light-transmissive module 2 is located at a light-emitting side of the lighting module 4. A light-guiding filling unit 5 is arranged in the cavity 3 along the extension direction of the housing 1 and is located between the lighting module 4 and the light-transmissive module 2.

Specifically, the LED lighting structure provided in this embodiment of the present disclosure includes a housing 1. The housing 1 serves as a main protective part of the lighting structure, and the housing 1 may be made of aluminum alloy, copper, or composite materials. The light-transmissive module 2 is connected to the housing 1, and the main function of the light-transmissive module 2 is to allow light emitted from the lighting module 4 to be evenly emitted. At least one cavity 3 is formed between the light-transmissive module 2 and the housing 1.

The lighting module 4 is disposed within the cavity 3 along the extension direction of the housing 1. In this embodiment, FIG. 1 shows a cross section of the LED lighting structure, and the extension direction of the housing 1 is perpendicular to the plane of FIG. 1. The housing 1 is located at a back side of the lighting module 4, that is, the upper side in FIG. 1, to better protect the lighting structure. The light-transmissive module 2 is located at a light-emitting side of the lighting module 4 so that the light emitted from the lighting module 4 can be more uniform. The light-guiding filling unit 5 is arranged within the cavity 3 along the extension direction of the housing 1 and is located between the lighting module 4 and the light-transmissive module 2. Three cavities 3 are illustratively shown in FIG. 1, although the number of cavities 3 is not limited and may be set according to actual needs in the present disclosure.

In some embodiments of the LED lighting structure, the light-guiding filling unit 5 is filled into all the cavities 3 so that the gaps within the cavities 3 are completely filled.

The LED lighting structure provided in this embodiment of the present disclosure includes a light-guiding filling unit arranged between the light-transmissive module and the lighting module, thereby eliminating gaps between the light-transmissive module and the lighting module. As a result, dust accumulation and contamination are avoided, and protection performance is enhanced. Moreover, the light-transmissive module improves optical output, allowing the light emitted from the lighting module to become softer and more uniform. The light-guiding filling unit also provides better heat dissipation for the lighting module.

According to one or more embodiments of the LED lighting structure, a refractive index of the light-guiding filling unit 5 in the LED lighting structure is between 1.4 and 1.55.

Specifically, the refractive index of the light-guiding filling unit 5 is set to a range of 1.4 to 1.55 so that the transmission efficiency of the light emitted from the lighting module 4 can be improved, reflection losses can be reduced when the light passes through the light-transmissive module 2, and good performance matching with the refractive index of adjacent components can be achieved.

According to one or more embodiments of the LED lighting structure, and with continued reference to FIG. 1, the light-transmissive module 2 includes a light-transmissive portion 21 and a first engaging portion 22. The housing 1 has a second engaging portion 11. At least one cavity 3 is formed between the light-transmissive portion 21 and the housing 1. The first engaging portion 22 is located on two sides of the light-transmissive portion 21. The first engaging portion 22 is detachably engaged with the second engaging portion 11. By providing the first engaging portion 22 and the second engaging portion 11, replacement of the light-transmissive module 2 is facilitated, thereby extending the service life of the LED lighting structure.

Further, according to one or more embodiments of the LED lighting structure, the light-transmissive portion 21 is made of a light-transmissive material, and the first engaging portion 22 is made of a non-transmissive material. By configuring the light-transmissive portion 21 to be light-transmissive and the first engaging portion 22 to be non-transmissive, light does not scatter through the first engaging portion 22, allowing the light emitted from the lighting module 4 to be more concentrated. In addition, the first engaging portion 22 can conceal air bubbles that may form in the housing 1 during the filling of the light-guiding filling unit 5. In some specific embodiments, the light-transmissive portion corresponds to a region disposed on the outer side of the lighting module and forming the cavity 3, while other regions may be configured as the non-transmissive first engaging portion 22.

According to one or more embodiments of the LED lighting structure, and with continued reference to FIG. 1, the first engaging portion 22 is a latch, and the second engaging portion 11 is an engagement groove. The lighting module 4 includes a substrate 41 and multiple LED components 42. The LED components 42 are disposed on the substrate 41, and the substrate 41 is fixedly connected to the housing 1. Along the thickness direction of the housing 1, the substrate 41 is located between the housing 1 and the light-transmissive module 2. The first engaging portion 22 extends upwardly away from the substrate, with respect to an imaginary line 21*x* extending in the width direction of the light-transmissive portion 21. Specifically, as shown in the FIGURE, between the light-transmissive portion 21 and the first engaging portion 22, the light-transmissive module 2 includes a first region A adjacent to the LED components 42 and a second region B away from the LED components 42. The light-transmissive module 2 extends upwardly from the first region A toward the second region B in a direction away from the substrate 41 such that along the thickness direction of the housing 1, a distance between the first region A and the substrate 41 is smaller than a distance between the second region B and the substrate 41.

Specifically, along the thickness direction of the housing 1, that is, the up-down direction in FIG. 1, the substrate 41 is located between the housing 1 and the light-transmissive module 2 and is tightly fitted to the housing 1. The substrate 41 may be made of polymethyl methacrylate, also known as acrylic plate or polycarbonate. The light-transmissive module 2 includes a first region A adjacent to the LED components 42 and a second region B away from the LED components 42. Along the thickness direction of the housing 1, the distance between the first region A and the substrate 41 is smaller than that between the second region B and the substrate 41. As shown in FIG. 1, a connection line between the first region A and the second region B forms an inclination angle. Such a configuration prevents damage to the light-transmissive module 2 caused by internal expansion when the light-guiding filling unit 5 is filled into the cavity. In other words, such a configuration serves as a pre-inclined structure for filling the light-guiding filling unit 5.

In the embodiments of the present disclosure, the housing is connected to the light-transmissive module through a latch. The distance between the first region A and the substrate 41 is smaller than the distance between the second region B and the substrate 41. Such a configuration facilitates the assembly and disassembly between the housing and the light-transmissive module, and also prevents the light-transmissive module from being damaged due to internal expansion during filling. Moreover, after the assembly of the LED lighting structure having the preceding pre-deformed light-transmissive module 2, the light-transmissive module 2 fits more closely to the substrate 41.

Figure 2:
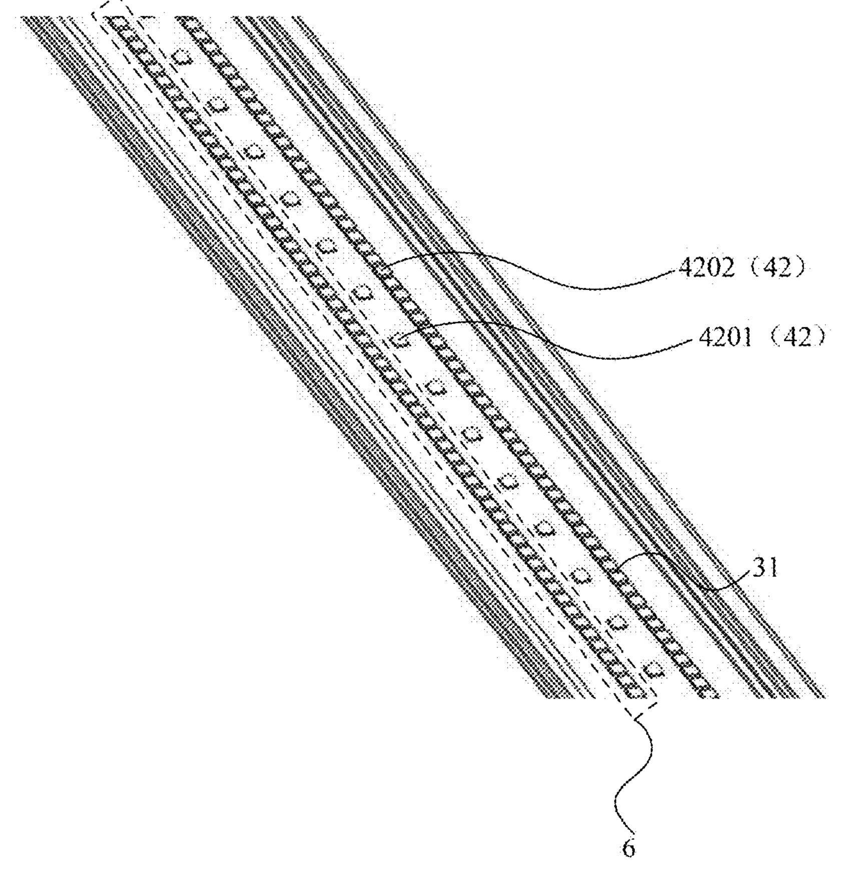
FIG. 2 is a partial real-object view of the LED lighting structure according to an embodiment of the present disclosure.

FIG. 2 is a partial real-object view of the LED lighting structure according to an embodiment of the present disclosure. Referring to FIGS. 1 and 2, optionally, the cavity 3 includes multiple elongated cavities 31. Multiple LED components 42 are uniformly distributed in each elongated cavity 31, and multiple LED components 42 form a light strip 6.

Specifically, the cavity 3 includes multiple elongated cavities 31. Multiple LED components 42 are uniformly distributed in each elongated cavity 31, and the multiple LED components 42 form a light strip 6. As shown in FIG. 2, the leftmost column of squares forms a light strip structure, and the middle portion also forms a light strip structure. Such a configuration allows light emitted from the LED components 42 to be more uniform. In addition, the use of elongated cavities 31 improves the heat dissipation performance of the entire lighting structure.

According to one or more embodiments of the LED lighting structure, the distance between two adjacent light strips 6 is 5 to 15 mm.

Specifically, the distance between two adjacent light strips 6 may be set to 5 to 15 mm. Such a configuration further improves the uniformity of emitted light and reduces the generation of stray light.

According to one or more embodiments of the LED lighting structure, the material of the light-guiding filling unit 5 includes an ultraviolet-curable adhesive or an optical silicone gel.

Specifically, the material of the light-guiding filling unit 5 may be an ultraviolet-curable adhesive or an optical silicone gel. The light-guiding filling unit 5 is a composite material containing organosilicon. The light-guiding filling unit 5 includes 0.1 wt % to 0.5 wt % of $SiO_2$ and $TiO_2$ core-shell scattering particles. The refractive index of the light-guiding filling unit 5 is 1.4 to 1.55. The thermal conductivity of the light-guiding filling unit 5 is greater than or equal to 0.5 W/(m·K). The thermal expansion coefficient of the light-guiding filling unit 5 is less than or equal to 80 ppm/° C.

According to one or more embodiments of the LED lighting structure, the light-transmissive portion 21 corresponding to a light-emitting side of each cavity 3 has a freeform curve shape. In the cross-sectional view as shown in the FIGURE, the inner sidewall 301 and the outer sidewall 302 of the light-transmissive portion 21 corresponding to a light-emitting side of each elongated cavity 31 are both freeform curves.

Specifically, such a configuration, instead of a traditional regular surface, allows precise control of light emitted from the lighting module 4, improves heat dissipation efficiency, expands the effective illumination range and light utilization efficiency, and enhances the overall appearance of the lighting structure.

According to one or more embodiments of the LED lighting structure, the housing includes a heat sink, and the heat sink is provided with multiple heat-dissipation fins 7 arranged at intervals. Mounting holes are formed at the end portion of the heat sink.

Specifically, in the lighting structure provided by the embodiments of the present disclosure, the housing 1 may be a heat sink. Thus, while protecting the lighting structure from external mechanical damage, the housing 1 also dissipates heat from the lighting module 4. To improve the heat dissipation performance of the lighting structure, the heat sink is provided with multiple heat-dissipation fins 7 arranged at intervals, thereby further enhancing the thermal performance of the lighting structure.

According to one or more embodiments of the LED lighting structure, with continued reference to FIG. 2, three elongated cavities 31 are provided. The LED components disposed in the elongated cavity located at the middle position are red LED components 4201, and LED components disposed in the elongated cavities on two sides are white LED components 4202. The red LED components 4201 have a peak wavelength in the range of 620 to 760 nanometers (nm), and the white LED components 4202 have a color temperature in the range of 2700 K to 6500 K. The arrangement of light strips formed by the white LED components 4202 on two sides of the light strip formed by the red LED components 4201 can function to supplement the spectrum in the range of 620 to 760 nanometers (nm), thereby providing a fixed illumination that is more suitable for plant growth.

According to one or more embodiments of the LED lighting structure, the LED lighting structure is a grow light.

According to one or more embodiments of the LED lighting structure, a plant lighting system is also provided. The plant lighting system employs the LED lighting structure described in one or more of the preceding embodiments. In one or more embodiments, multiple elongated cavities are in fluid communication with one another. In another embodiment, multiple elongated cavities are not in fluid communication with one another.

Furthermore, with continued reference to FIG. 1, the LED lighting structure described in one or more of the preceding embodiments is fabricated through the following manufacturing process of the LED lighting structure:

First, the lighting module 4 is fixedly connected to the housing 1. Specifically, an adhesive is used to fix the substrate 41 of the lighting module 4 to the housing 1, followed by high-temperature baking and curing.

Next, the light-transmissive module 2 is fixedly connected to the housing 1. Specifically, the latch 22 of the light-transmissive module 2 engages with the engagement groove 11 of the housing 1, and then the light-transmissive module 2 is fixedly connected to the housing 1 through an adhesive. After fixation, a cavity 3 is formed between the light-transmissive module 2 and the housing 1.

Then, a liquid light-guiding filling unit 5 is injected into the cavity 3 from one end of the cavity 3. Specifically, a dispensing machine is used for injection.

Next, the liquid level of the light-guiding filling unit 5 within the cavity 3 is observed until completion. Specifically, the liquid level of the light-guiding filling unit 5 within the cavity 3 may be monitored by visual inspection or ultrasonic detection.

Finally, after the injection port is sealed with a plug, the assembly is allowed to stand at room temperature or under heating until the light-guiding filling unit 5 is cured.

Grow Light

In another aspect, the present disclosure also provides a grow light. The grow light is described below with reference to the structure shown in FIGS. 1 and 2. The grow light provided by the present disclosure includes a housing 1, a light-transmissive module 2, and a lighting module 4. The light-transmissive module 2 is connected to the housing 1, and a cavity 3 is formed between the light-transmissive module 2 and the housing 1 after the connection. The lighting module 4 is disposed within the cavity 3. In the assembled state, the housing 1 is located at the back side of the lighting module 4, and the light-transmissive module 2 is located at the light-emitting side of the lighting module 4.

A light-guiding filling unit 5 is filled between the lighting module 4 and the light-transmissive module 2.

The external appearance of the grow light provided by the present disclosure is not limited to the shapes disclosed in FIGS. 1 and 2. In FIGS. 1 and 2, the housing 1 has an elongated shape, the lighting module 4 is disposed along an extension direction of the housing 1 within the cavity 3, and the light-guiding filling unit 5 is arranged along the extension direction of the housing 1 in the cavity 3 and located between the lighting module 4 and the light-transmissive module 2. In other embodiments different from those illustrated, the housing 1 may have any suitable shape, such as a ring shape or a disc shape. The lighting module 4 is disposed on the housing 1, and the arrangement position of is not necessarily related to the shape of the housing 1. For example, in a specific embodiment, the lighting module 4 may be discretely disposed on a disc-shaped housing 1, the light-transmissive module 2 may be multiple dome-like covers enclosing the periphery of the lighting module 4, and a light-guiding filling unit 5 is filled between a corresponding light-transmissive module 2 and a corresponding lighting module 4.

For grow lights, luminous efficacy is one of the key parameters for evaluating light performance. By providing a light-guiding filling unit 5 between the lighting module 4 and the light-transmissive module 2, the difference in the refractive index between the two media is reduced. That is, the difference between the refractive index of the light-guiding filling unit 5 and the refractive index of the lighting module 4 is small, which is smaller than that between the refractive index of the lighting module 4 and the refractive index of air in conventional lights. Likewise, the difference between the refractive index of the light-guiding filling unit 5 and the refractive index of the light-transmissive module 2 is small, which is smaller than that between the refractive index of the light-transmissive module 2 and the refractive index of air in conventional lights. As a result, when light emitted from the lighting module 4 passes through the light-guiding filling unit 5 to the light-transmissive module 2 and exits from the light-emitting surface of the light-transmissive module 2, total internal reflection is reduced compared to conventional unfilled structures, thereby improving light transmittance and enhancing overall optical output efficiency and luminous performance. In addition, the light-guiding filling unit 5 forms an effective thermal conduction path between the lighting module 4 and the light-transmissive module 2, which assists in dissipating heat from the lighting module 4 and further enhances the stability and service life of the grow light.

According to one or more embodiments of the grow light, the lighting module 4 includes red LED components and white LED components. The white LED components are flat-top LED components, and the light-guiding filling unit 5 is filled between the white LED components and the light-transmissive module 2. The quantity and arrangement of the red LED components and white LED components are not limited to the configuration shown in the FIGURES. For example, the red LED components may form a single row, and the white LED components may form two rows. In some suitable embodiments, at least one red LED component is provided, and at least one white LED component is provided.

It is understood that a red LED component refers to a light-emitting diode whose dominant emission wavelength (main peak wavelength) ranges from 600 nm to 700 nm under operating current conditions. The light-emitting chip of the red LED component typically adopts an AlGaInP or GaAsP material system. A white LED component refers to a light-emitting diode that produces a visually white light output. Its emission spectrum is typically generated by exciting phosphor using a blue light chip, and the chromaticity coordinates of the emitted light fall within the white region of the CIE chromaticity diagram, corresponding to a correlated color temperature of 2700 K to 6500 K. Specifically, the white light may be generated by a blue light chip (about 450 nm) exciting a yellow phosphor (YAG). A flat-top LED component refers to a light-emitting diode with a flat encapsulation top surface, in which the light-emitting surface is substantially parallel to the encapsulation base. In certain embodiments, the flat-top LED component of the present disclosure is an independent standard component.

It is known that when light passes from one medium into another medium with a different refractive index, the light changes direction at the interface due to the difference in light propagation speed between the two media, that is, refraction occurs. In conventional lights using flat-top LED components, the medium between the flat-top LED component and the light-transmissive module is typically air. When light exits the light-emitting surface of the flat-top LED component, refraction and partial reflection occur at the LED-air interface and the air-light-transmissive module interface. Because a white LED component generates light by exciting phosphor with a blue light chip, the reflected light at the LED-air interface irradiates the phosphor layer again, causing partial repeated excitation of the phosphor. This reduces the effective conversion efficiency of phosphor for blue light per unit time, thereby decreasing the proportion of blue light emitted by the LED component.

A light-guiding filling unit 5 is filled between the flat-top LED component and the light-transmissive module 2. The difference between the refractive index of the light-guiding filling unit 5 and the refractive index of the encapsulant of the flat-top LED component is small, and the difference between the refractive index of the light-guiding filling unit 5 and the refractive index of the light-transmissive module 2 is also small. In this manner, after light exits the light-emitting side of the flat-top LED component, refraction mainly occurs at the interface between the light-transmissive module 2 and the external air. The white light generated by excitation of phosphor from the blue light chip reduces the reflection at the phosphor-air interface in conventional lights, thereby reducing re-excitation of blue light by the phosphor and increasing the proportion of blue light that exits directly. This increases the proportion of blue light in the spectrum emitted by the LED component.

The reason for selecting a flat-top LED component instead of a dome-type LED component for the white LED components is that a dome-type LED component has a raised lens structure above the light-emitting chip. The lens is used for focusing or adjusting the light direction to form a concentrated or directional beam. The spectral ratio of dome-type LED components is preconfigured at the factory. Therefore, even if a light-guiding filling unit 5 is filled around a dome-type white LED component, it cannot increase the proportion of blue light emitted by the LED component.

The applicant has found that by filling a light-guiding filling unit 5 between a white LED component and the light-transmissive module 2 and configuring the white LED component as a flat-top LED component, the refraction phenomena described above cause the spectrum of light emitted from the white LED component to shift. The proportion of red light (wavelength 600 nm to 700 nm) decreases, and the proportion of blue light (wavelength 400 nm to 499 nm) increases, resulting in a spectral blue shift. While this effect is generally considered negative in general lighting, it provides beneficial effects in plant lighting applications. The reason is that plants have high absorption rates for blue and red light, and in current indoor or high-power plant lighting designs, the content of red light is already high, and absorption by plants approaches saturation. Various designs are pursuing the increase in the proportion of blue light at low cost. Properly increasing the proportion of blue light effectively promotes photosynthesis and morphological regulation in plants, thereby achieving better plant growth results.

In conventional plant lighting designs, to increase the blue light proportion, it is usually necessary to add more white LED components to supplement blue light. Among general-purpose white LED components, those with a color temperature of 6500 K have the highest proportion of blue light, but the proportion of blue light in such white LED components is still not high enough. If further increasing the proportion of blue light is required, additional blue LED components need to be added separately or part of the white LED components need to be replaced, which will increase the cost of plant lighting design and reduce the PPE efficacy.

In the grow light of the present disclosure, by filling a light-guiding filling unit 5 between flat-top white LED components and the light-transmissive module 2, the proportion of blue light of light emitted from the flat-top white LED components increases without increasing the number of LED components or cost, thereby increasing the overall proportion of blue light of the grow light. Flat-top white LED components are inexpensive, so this solution achieves an increased proportion of blue light at low cost.

According to one or more embodiments of the grow light, a light-guiding filling unit 5 is also filled between the red LED components and the light-transmissive module 2 to reduce interfacial refraction and improve luminous efficacy.

Figure 3:
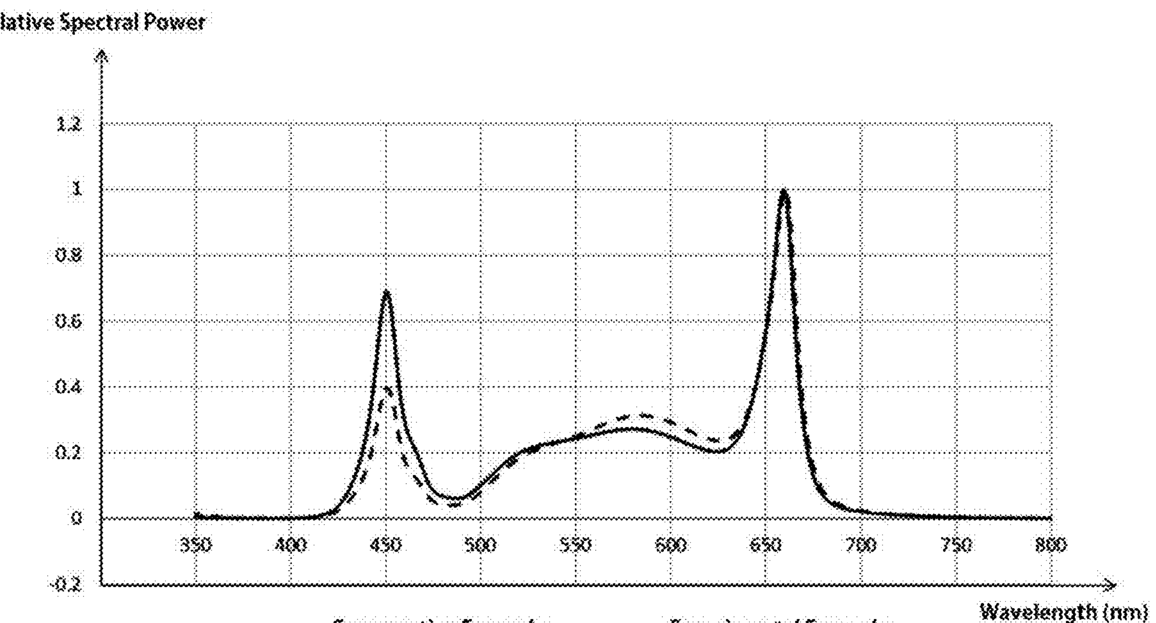
FIG. 3 is a comparison curve of the relative SPD spectrum between the grow light according to the embodiments of the present disclosure and a conventional grow light.

Reference is made to FIG. 3, which shows the relative SPD spectral comparison curves of the experimental example and the comparative example.

In the light structure of the experimental example, the lighting module includes white LED components and red LED components. The white LED components are flat-top LED components. The quantity ratio of white LED components to red LED components is 2:1. The color temperature of the white LED components is 4000 K, and the peak wavelength of the red LED components is 660 nm. A light-guiding filling unit 5 is filled between the white LED components, the red LED components, and the light-transmissive module 2.

In the light structure of the comparative example, the lighting module includes white LED components and red LED components. The white LED components are flat-top LED components. The quantity ratio of white LED components to red LED components is 2:1. The color temperature of the white LED components is 4000 K, and the peak wavelength of the red LED components is 660 nm. No material is filled between the white LED components and the light-transmissive module, or between the red LED components and the light-transmissive module; only air is present.

In the FIGURE, the curve of the experimental example is represented by a solid black line, and the curve of the comparative example is represented by a dashed black line. The horizontal axis represents the spectral wavelength, with different wavelengths corresponding to different colors of light (such as blue, green, and red). The vertical axis represents relative spectral power, indicating the energy intensity radiated by the light source at different wavelengths.

By comparing the curves, it can be seen that energy intensity of the blue light in the wavelength range of 400 nm to 499 nm increases in the experimental example, resulting in an increased proportion of blue light.

Within the range of 400 nm to 700 nm where the wavelength of blue light corresponds to 400 nm to 499 nm, the wavelength of green light corresponds to 500 nm to 599 nm, and the wavelength of red light corresponds to 600 nm to 700 nm, it is calculated that in the experimental example, the blue light proportion is 18.99%, the green light proportion is 31.99%, and the red light proportion is 49.02%. For the comparative example, the blue light proportion is 11.82%, the green light proportion is 34.34%, and the red light proportion is 53.84%. That is, filling the light-guiding filling unit 5 increases the blue light proportion by 7.17%.

Furthermore, the calculation of optical radiation power in the range of 400 nm to 700 nm shows that the optical radiation power of the experimental example is 63808 W, whereas optical radiation power of the comparative example is 62074 W. By comparison, filling the light-guiding filling unit 5 increases the optical radiation power of the grow light by 2.79%.

According to one or more embodiments of the grow light, the light-guiding filling unit 5 uses a material having a refractive index the same as or close to the refractive index of the LED encapsulant. In some specific embodiments, the refractive index of the light-guiding filling unit 5 is 1.4 to 1.55.

According to one or more embodiments of the grow light, the material of the light-guiding filling unit 5 includes an ultraviolet-curable adhesive or an optical silicone gel. In some specific embodiments, the light-guiding filling unit 5 is a composite material containing organosilicon. The light-guiding filling unit 5 includes 0.1 wt % to 0.5 wt % of $SiO_2$ and $TiO_2$ core-shell scattering particles. The refractive index of the light-guiding filling unit 5 is 1.4 to 1.55. The thermal conductivity of the light-guiding filling unit 5 is greater than or equal to 0.5 W/(m·K). The thermal expansion coefficient of the light-guiding filling unit 5 is less than or equal to 80 ppm/° C.

According to one or more embodiments of the grow light, the housing 1 has an elongated shape, and the light-transmissive module 2 is connected to the housing 1. At least one cavity 3 is formed between the light-transmissive module 2 and the housing 1. A lighting module 4 is disposed along the extension direction of the housing 1 within the cavity 3.

According to one or more embodiments of the grow light, the light-guiding filling unit 5 is filled into all the cavities 3 so that the gaps within the cavities 3 are completely filled.

According to one or more embodiments of the grow light, the light-transmissive module 2 includes a light-transmissive portion 21 and a first engaging portion 22. The housing 1 has a second engaging portion 11. At least one cavity 3 is formed between the light-transmissive portion 21 and the housing 1. The first engaging portion 22 is located on two sides of the light-transmissive portion 21. The first engaging portion 22 is detachably engaged with the second engaging portion 11. By providing the first engaging portion 22 and the second engaging portion 11, replacement of the light-transmissive module 2 is facilitated, thereby extending the service life of the LED lighting structure.

According to one or more embodiments of the grow light, the light-transmissive portion 21 is made of a light-transmissive material, and the first engaging portion 22 is made of a non-transmissive material. By configuring the light-transmissive portion 21 to be light-transmissive and the first engaging portion 22 to be non-transmissive, light does not scatter through the first engaging portion 22, allowing the light emitted from the lighting module 4 to be more concentrated. In addition, the first engaging portion 22 can conceal air bubbles that may form in the housing 1 during the filling of the light-guiding filling unit 5. In some specific embodiments, the light-transmissive portion is a region disposed on the outer side of the lighting module and forming the cavity 3, while other regions may be configured as the non-transmissive first engaging portion 22.

According to one or more embodiments of the grow light, the first engaging portion 22 is a latch, and the second engaging portion 11 is an engagement groove. The lighting module 4 includes a substrate 41 and multiple LED components 42. The LED components 42 are disposed on the substrate 41, and the substrate 41 is fixedly connected to the housing 1. Along the thickness direction of the housing 1, the substrate 41 is located between the housing 1 and the light-transmissive module 2. The first engaging portion 22 extends upwardly away from the substrate, with respect to an imaginary line 21*x* extending in the width direction of the light-transmissive portion 21. Specifically, as shown in the FIGURE, between the light-transmissive portion 21 and the first engaging portion 22, the light-transmissive module 2 includes a first region A adjacent to the LED components 42 and a second region B away from the LED components 42. The light-transmissive module 2 extends upwardly from the first region A toward the second region B in a direction away from the substrate 41 such that along the thickness direction of the housing 1, the distance between the first region A and the substrate 41 is smaller than the distance between the second region B and the substrate 41.

According to one or more embodiments of the grow light, along the thickness direction of the housing 1, that is, the up-down direction in FIG. 1, the substrate 41 is located between the housing 1 and the light-transmissive module 2 and is tightly fitted to the housing 1. The substrate 41 may be made of polymethyl methacrylate also known as acrylic plate or polycarbonate. The light-transmissive module 2 includes a first region A adjacent to the LED components 42 and a second region B away from the LED components 42. Along the thickness direction of the housing 1, the distance between the first region A and the substrate 41 is smaller than that between the second region B and the substrate 41. As shown in FIG. 1, a connection line between the first region A and the second region B forms an inclination angle. Such a configuration prevents damage to the light-transmissive module 2 caused by internal expansion when the light-guiding filling unit 5 is filled into the cavity. In other words, such a configuration serves as a pre-inclined structure for filling the light-guiding filling unit 5. In the present disclosure, the housing is connected to the light-transmissive module through a latch. The distance between the first region A and the substrate 41 is smaller than the distance between the second region B and the substrate 41. Such a configuration facilitates the assembly and disassembly between the housing and the light-transmissive module, and also prevents the light-transmissive module from being damaged due to internal expansion during filling. Moreover, after assembly of the LED lighting structure having the preceding pre-deformed light-transmissive module 2, the light-transmissive module 2 fits more closely to the substrate 41.

According to one or more embodiments of the grow light, the cavity 3 includes multiple elongated cavities 31. Multiple LED components 42 are uniformly distributed in each elongated cavity 31, and multiple LED components 42 form a light strip 6. Multiple LED components 42 are uniformly distributed in each elongated cavity 31, and the multiple LED components 42 form a light strip 6. As shown in FIG. 2, the leftmost column of squares forms a light strip structure, and the middle portion also forms a light strip structure. Such a configuration allows light emitted from the LED components 42 to be more uniform. In addition, the use of elongated cavities 31 improves the heat dissipation performance of the entire lighting structure. In this embodiment, the light-guiding filling unit 5 is filled into all elongated cavities 31 and completely occupies the voids in the cavities 3. The light-guiding filling unit 5 may be continuously filled into the elongated cavities 31, for example, by a glue-pouring process.

According to one or more embodiments of the grow light, the distance between two adjacent light strips 6 is 5 to 15 mm. Such a configuration further improves the uniformity of emitted light and reduces the generation of stray light.

According to one or more embodiments of the grow light, the light-transmissive portion 21 corresponding to a light-emitting side of each cavity 3 has a freeform curve shape. In the cross-sectional view as shown in the FIGURE, the inner sidewall 301 and the outer sidewall 302 of the light-transmissive portion 21 corresponding to a light-emitting side of each elongated cavity 31 are both freeform curves. Such a configuration, instead of a traditional regular surface, allows precise control of light emitted from the lighting module 4, improves heat dissipation efficiency, expands the effective illumination range and light utilization efficiency, and enhances the overall appearance of the lighting structure.

According to one or more embodiments of the grow light, the housing 1 may be made of aluminum alloy, copper, or composite materials, and the light-transmissive module 2 is used to allow light emitted from the lighting module 4 to be evenly emitted. Specifically, the housing 1 includes a heat sink, and the heat sink is provided with multiple heat-dissipation fins 7 arranged at intervals. Mounting holes are formed at the end portion of the heat sink.

According to one or more embodiments of the grow light, three elongated cavities 31 are provided. LED components disposed in an elongated cavity located at a middle position are red LED components 4201, and LED components disposed in elongated cavities located at two sides are white LED components 4202.

According to one or more embodiments of the grow light, the grow light is suitable for indoor planting lighting or high-power plant lighting.

The specific embodiments described above do not constitute a limitation on the scope of the present disclosure. It is to be understood by those skilled in the art that the present disclosure is not limited to the specific embodiments described herein. Various apparent modifications, combinations, sub-combinations, and substitutions may be performed according to design requirements and other factors. Accordingly, although the present disclosure has been described in detail through the foregoing embodiments, it is not limited thereto. Any modifications, equivalent substitutions, improvements, and the like made within the spirit and principle of the present disclosure fall within the scope of the present disclosure.

What is claimed is:

1. An LED lighting structure, comprising:

a housing having an elongated shape;

a light-transmissive module connected to the housing, wherein at least one cavity is formed between the light-transmissive module and the housing;

a lighting module disposed in a cavity of the at least one cavity, wherein the housing is located at a back side of the lighting module, and the light-transmissive module is located at a light-emitting side of the lighting module; and a light-guiding filling unit arranged in the cavity along an extension direction of the housing and located between the lighting module and the light-transmissive module;

wherein the light-transmissive module comprises a light-transmissive portion having an elongated shape;

wherein the cavity comprises a plurality of elongated cavities, and a plurality of LED components are distributed in each elongated cavity of the plurality of elongated cavities along an extension direction of the each elongated cavity to form a light strip; and wherein the lighting module comprises at least one red LED component and at least one white LED component, the white LED component is a flat-top LED component, and a light-guiding filling unit is filled between the white LED component and the light-transmissive module.

2. The LED lighting structure of claim 1, wherein a refractive index of the light-guiding filling unit is between 1.4 and 1.55.

3. The LED lighting structure of claim 1, wherein the light-transmissive module further comprises a first engaging portion, the housing comprises a second engaging portion, the at least one cavity is formed between the light-transmissive portion and the housing, and the first engaging portion is located at two sides of the light-transmissive portion;

wherein the first engaging portion is detachably engaged with the second engaging portion.

4. The LED lighting structure of claim 3, wherein the light-transmissive portion is made of a light-transmissive material, and the first engaging portion is made of a non-transmissive material.

5. The LED lighting structure of claim 3, wherein the first engaging portion is a latch, the second engaging portion is an engagement groove, the lighting module comprises a substrate and a plurality of LED components disposed on the substrate, and the substrate is fixedly connected to the housing;

wherein the first engaging portion extends upwardly away from the substrate, with respect to an imaginary line extending in a width direction of the light-transmissive portion.

6. The LED lighting structure of claim 1, wherein the light-transmissive portion corresponding to a light-emitting side of each of the plurality of elongated cavities has a freeform curve shape.

7. The LED lighting structure of claim 1, wherein three elongated cavities are provided, wherein LED components disposed in an elongated cavity located at a middle position are red LED components, and LED components disposed in elongated cavities located at two sides are white LED components.

8. The LED lighting structure of claim 1, wherein a material of the light-guiding filling unit comprises an ultraviolet-curable adhesive or an optical silicone gel.

9. The LED lighting structure of claim 1, wherein the plurality of elongated cavities are in fluid communication with each other.

10. A grow light, comprising a housing, a light-transmissive module, and a lighting module, wherein the light-transmissive module is connected to the housing, the lighting module is disposed in a cavity formed between the light-transmissive module and the housing, the housing is located at a back side of the lighting module, and the light-transmissive module is located at a light-emitting side of the lighting module;

wherein at least a portion between the lighting module and the light-transmissive module is filled with a light-guiding filling unit; and wherein the lighting module comprises at least one red LED component and at least one white LED component, the white LED component is a flat-top LED component, and a light-guiding filling unit is filled between the white LED component and the light-transmissive module.

11. The grow light of claim 10, wherein a light-guiding filling unit is also filled between the red LED component and the light-transmissive module.

12. The grow light of claim 10, wherein a refractive index of the light-guiding filling unit is between 1.4 and 1.55.

13. The grow light of claim 10, wherein a material of the light-guiding filling unit comprises an ultraviolet-curable adhesive or an optical silicone gel.

14. A grow light, comprising:

a housing having an elongated shape;

a light-transmissive module connected to the housing, wherein at least one cavity is formed between the light-transmissive module and the housing;

a lighting module disposed in a cavity of the at least one cavity, wherein the housing is located at a back side of the lighting module, and the light-transmissive module is located at a light-emitting side of the lighting module; and a light-guiding filling unit;

wherein the lighting module comprises at least one red LED component and at least one white LED component, the white LED component is a flat-top LED component, the white LED component is distributed along an extension direction of the housing within the cavity, the light-guiding filling unit is filled between the white LED component and the light-transmissive module, and the light-guiding filling unit is distributed along the extension direction of the housing between the white LED component and the light-transmissive module.

15. The grow light of claim 14, wherein the red LED component is distributed along the extension direction of the housing within the cavity, and the light-guiding filling unit is distributed along the extension direction of the housing between the red LED component and the light-transmissive module.

16. The grow light of claim 14, wherein a refractive index of the light-guiding filling unit is between 1.4 and 1.55.

17. The grow light of claim 14, wherein the light-transmissive module comprises a light-transmissive portion and a first engaging portion, the housing comprises a second engaging portion, the at least one cavity is formed between the light-transmissive portion and the housing, and the first engaging portion is located at two sides of the light-transmissive portion;

wherein the first engaging portion is detachably engaged with the second engaging portion, the light-transmissive portion is made of a light-transmissive material, and the first engaging portion is made of a non-transmissive material.

18. The grow light of claim 15, wherein the cavity comprises a plurality of elongated cavities, a plurality of LED components are distributed in each elongated cavity of the plurality of elongated cavities along an extension direction of the each elongated cavity to form a light strip, and the light-transmissive portion corresponding to a light-emitting side of each of the plurality of elongated cavities has a freeform curve shape.

* * * * *